United States Patent
Koiso et al.

(10) Patent No.: US 7,239,278 B2
(45) Date of Patent: Jul. 3, 2007

(54) DETECTION SYSTEM, DETECTION METHOD, AND DETECTION COMPUTER PROGRAM PRODUCT

(75) Inventors: Takashi Koiso, Kawasaki (JP); Kanako Hattori, Yokohama (JP); Naoki Imasaki, Kamakura (JP); Shigeru Kambayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 406 days.

(21) Appl. No.: 10/885,080

(22) Filed: Jul. 7, 2004

(65) Prior Publication Data

US 2005/0046577 A1 Mar. 3, 2005

(30) Foreign Application Priority Data

Jul. 8, 2003 (JP) .......................... P2003-193794

(51) Int. Cl.
  *G01S 3/02* (2006.01)
(52) U.S. Cl. .................................... 342/465
(58) Field of Classification Search ........ 342/463–465, 342/451; 340/573.4
  See application file for complete search history.

(56) References Cited

U.S. PATENT DOCUMENTS 6,112,081 A * 8/2000 Namura et al. ............. 455/424

FOREIGN PATENT DOCUMENTS

| JP | 6-152504 | 5/1994 |
| JP | 11-113047 | 4/1999 |
| JP | 11-178041 | 7/1999 |
| JP | 2000-163675 | 6/2000 |
| JP | 2001-128227 | 5/2001 |

OTHER PUBLICATIONS

English Translation of JP 11-113047.*
English Translation of JP 11-178041.*
English Translation of JP 2000-163675 A.*
English Translation of JP 6-152504.*
Notice of Rejection Reasons Issued by the Japanese Patent Office on Jun. 27, 2006, in Japanese Patent Application No. 2003-193794, and English-language translation thereof.

* cited by examiner

*Primary Examiner*—Thomas H. Tarcza
*Assistant Examiner*—Fred H. Mull
(74) *Attorney, Agent, or Firm*—Finnegan, Henderson, Farabow, Garrett & Dunner, L.L.P.

(57) ABSTRACT

A detection system includes a sensitiveness level setup control section and a receiver control section. The sensitiveness level setup control section looks into a sensitiveness level setup file and finds the sequence of levels of sensitiveness to the received signals corresponding to the setup ID. The receiver control section converts, for each component, a sequence of levels of sensitiveness to received signals received from the sensitiveness level switching section into signals for designating levels of sensitiveness to received signals corresponding to the respective receivers, and transmits the signals for designating levels of sensitiveness to received signals through the communication network.

11 Claims, 13 Drawing Sheets

FIG. 4
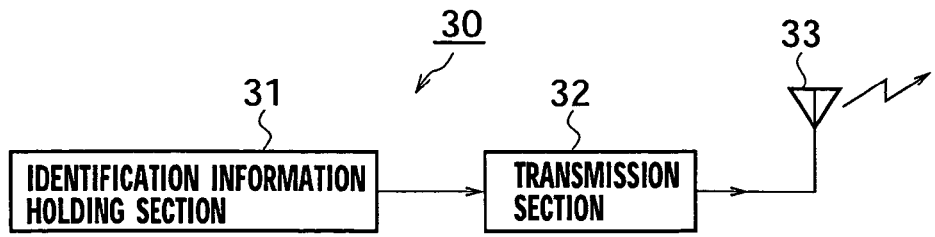
FIG. 5
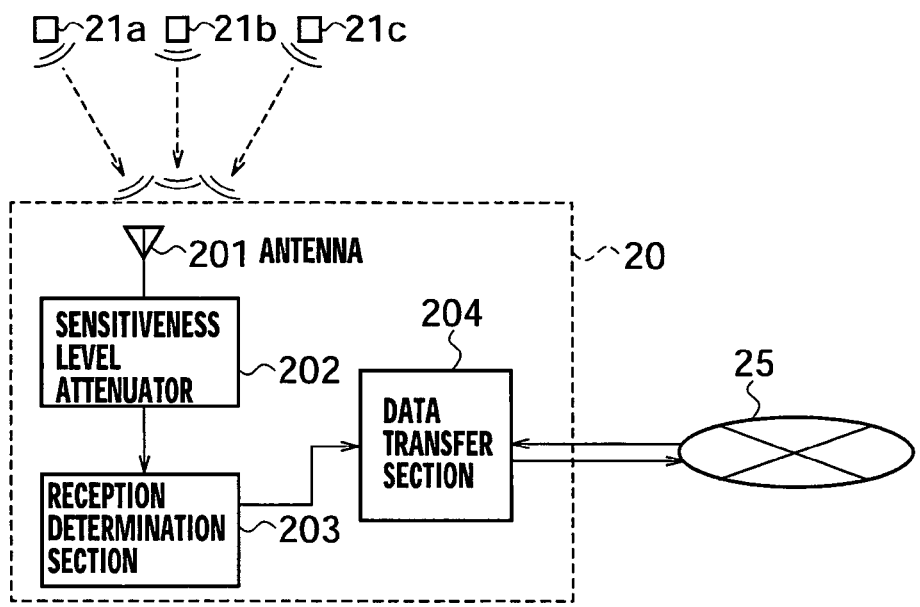
FIG. 6
| SET ID | SEQUENCE OF LEVELS of SENSITIVENESS TO RECEIVED SIGNALS | | | |
| --- | --- | --- | --- | --- |
| | RECEIVER 1 | RECEIVER 2 | · · · · · · · · · · | RECEIVER N |
| 0001 | 5 | 6 | · · · · · · · · · · | 5 |
| 0002 | ∞ | 6 | · · · · · · · · · · | 5 |
| 0003 | ∞ | ∞ | · · · · · · · · · · | ∞ |
| ⋮ | ⋮ | ⋮ | · · · · · · · · · · | ⋮ |
| 000n | v | v | · · · · · · · · · · | v |
| ⋮ | ⋮ | ⋮ | · · · · · · · · · · | ⋮ |

FIG. 12

| SEQUENCE OF ABNORMAL STATES ||| SET ID |
|---|---|---|---|
| SENSOR 1 | SENSOR 2 | ⋯ SENSOR n | |
| ≦500, ≧1500 | ≦15, ≧100 | ⋯ ≦-∞, ≧+∞ | 0010 |
| ≦500 | ≦15, ≧100 | ⋯ ≦-∞, ≧+∞ | 0004 |
| ⋯ | ⋯ | ⋯ | ⋯ |

| CURRENT POSITION | ADJACENT POSITION |
|---|---|
| RANGE A | RANGE D, RANGE E |
| RANGE B | RANGE C, RANGE D |
| RANGE C | RANGE B, RANGE D |
| RANGE D | RANGE A, RANGE B, RANGE C, RANGE E |
| RANGE E | RANGE A, RANGE D |

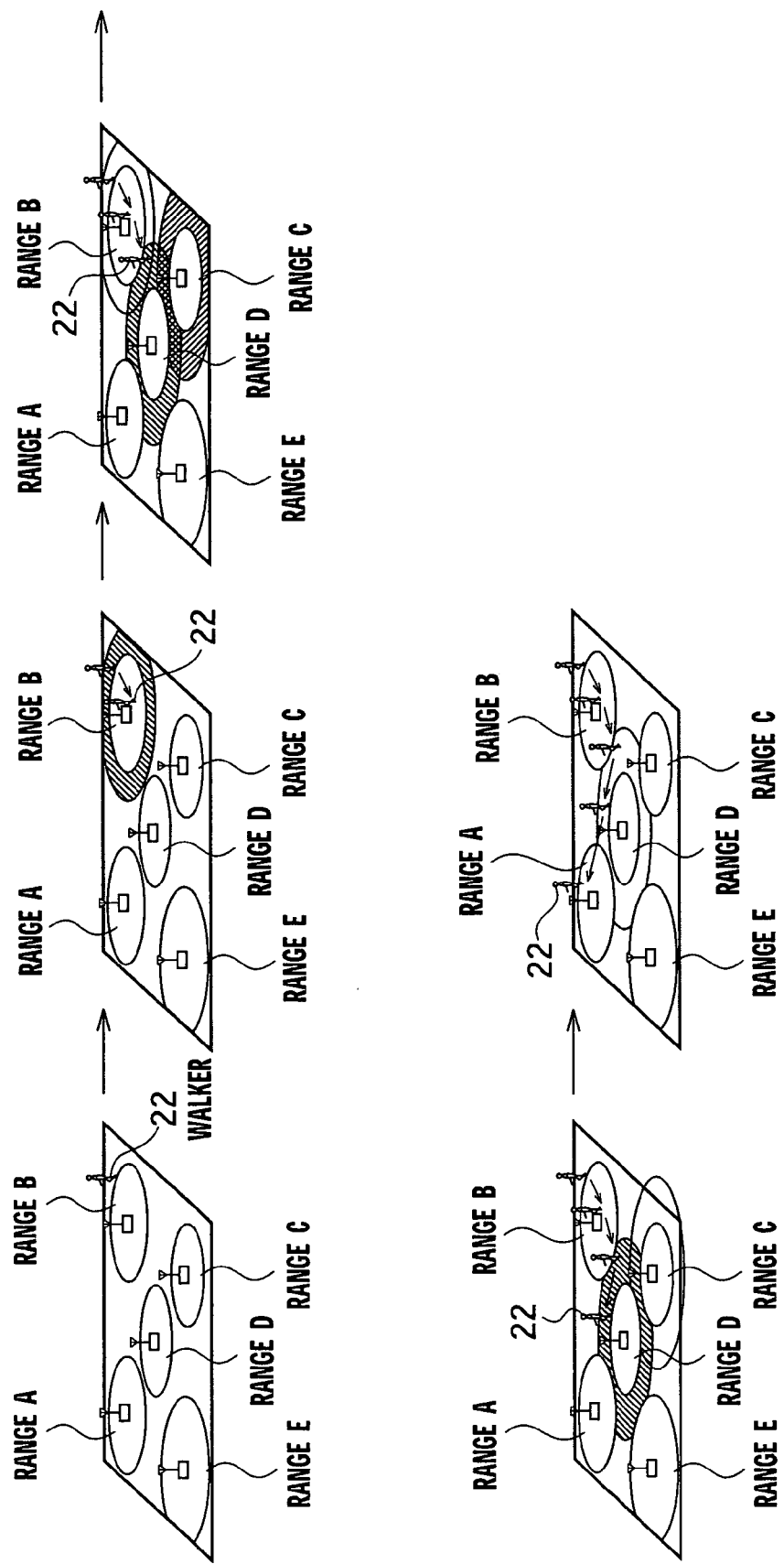

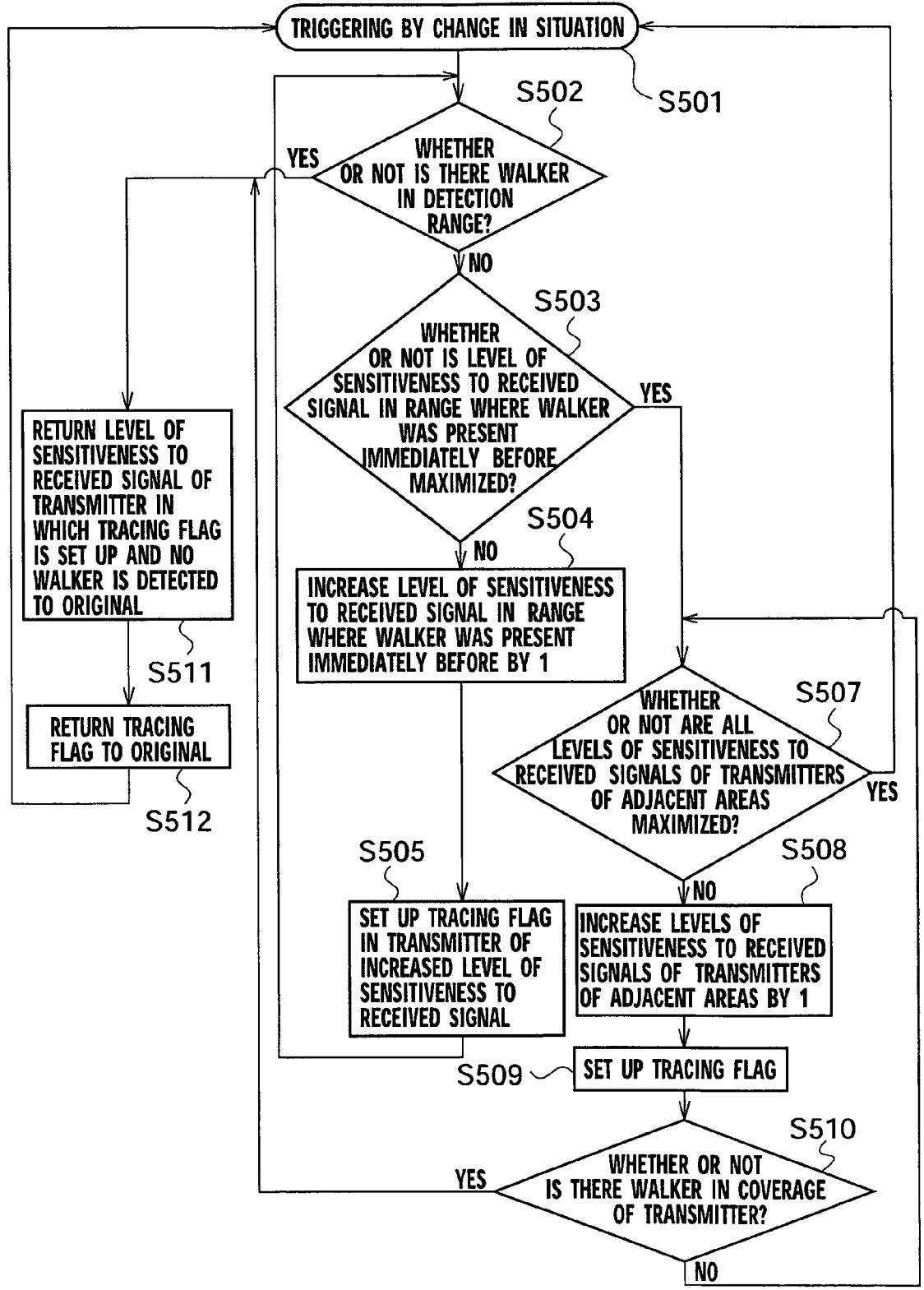

DETECTION SYSTEM, DETECTION METHOD, AND DETECTION COMPUTER PROGRAM PRODUCT

CROSS REFERENCE TO RELATED APPLICATIONS

This application is based upon and claims the benefit of priority from prior Japanese Patent Application P2003-193794 filed on Jul. 8, 2003; the entire contents of which are incorporated by reference herein.

BACKGROUND OF THE INVENTION

1. Field of the Invention

The present invention relates to a detection system, a detection method and a detection program product for detecting an object present in a given observation area.

2. Description of the Related Art

It has been a conventional practice that a plurality of receivers are installed in an area such as an event hall, and a walker who moves around in the area carries a transmitter so that a position of the walker can be estimated. Receivers of the area detect a transmitted signal sent from the transmitter. Each receiver transmits information obtained from the transmitter by radio or cable to a certain position detection system. A position detection system and a position detection method have been disclosed which can detect a position of a moving object such as a walker by using a mobile communications system in this way.

For example, in an observation area 126 to be observed, as shown in FIG. 1, a transmitted signal sent from a transmitter 121 carried by a walker 122 is received by receivers 120a, 120b, . . . , and 120e, and is relayed to a position detection system through a communications network 125. Accordingly, a position of the walker can be detected. By designating a detection range of the receiver 120a as an area A, a detection range of the receiver 120b as an area B, . . . , and a detection range of the receiver 120e as an area E, it is possible to recognize a movement of the walker 122, for example, from the area E, the area A, the area B, the area C to the area D through the receivers 120a, 120b, . . . , 120e in FIG. 1. In this case, the ranges detectable with the respective receivers must be adjusted depending on the state of receiving transmitted signals in accordance with a surrounding physical environment thereof. As shown in FIG. 2, when a crossover region 127 takes place between the areas C and D, a change in intensity of a signal transmitted from a transmitter or the like caused by a direction of the body of the walker may lead to a false position recognition because both of the two receivers 120c and 120d are allowed to receive the transmitted signal. Thus, it is undesirable to create an area, which can be sensed by a plurality of receivers. When a man judges there is crossover area, detection ranges must be arranged so as not to create any crossover area by adjusting each receiver.

Meanwhile, when a disaster occurs in the observation area, it is necessary to instantly determine whether or not there is a walker near the disaster site. For example, in FIG. 1, when a man judges the entire observation area 126 is dangerous, coverage by all the receivers 120a, 120b, . . . , 120e must be maximized to judge whether no walkers are present in the observation area 126. Heretofore, however, it has been difficult to instantly switch the coverage by the plurality of receivers in response to such a situation.

Conventionally, when coverage by the receivers is adjusted, a man judges the present situation, and adjusts each receiver.

SUMMARY OF THE INVENTION

Therefore, a main object of the present invention is to provide a detection system, a detection method, and a detection program product, which enable coverage of a plurality of receivers to be instantly switched in response to a situation.

A first aspect of the present invention is to provide a detection system for detecting a position of a moving object based on information of a transmitter that the moving object carries while moving around in an observation area, including: a) a plurality of receivers receiving the information transmitted from the transmitter; b) a sensitiveness level setup control section which looks into a sensitiveness level setup file, including a sequence of levels of sensitiveness to received signals transmitted from the plurality of receivers, which is a sequence expressed by values, as components, representing intensity of sensitiveness to the received signals, and setup IDs specific of the sequence of levels of sensitiveness to the received signals, and finds the sequence of levels of sensitiveness to the received signals corresponding to the setup ID; c) a switching instruction section, which designates a specific, setup ID in order to set up levels of sensitiveness to the received signals transmitted from the plurality of receivers; d) a sensitiveness level switching section which receives from the sensitiveness level setup control section a sequence of levels of sensitiveness to received signals corresponding to the specific setup ID received from the switching instruction section; and e) a receiver control section which converts, for each component, a sequence of levels of sensitiveness to received signals received from the sensitiveness level switching section into signals for designating levels of sensitiveness to received signals corresponding to the respective receivers, and transmits the signals for designating levels of sensitiveness to received signals.

A second aspect of the present invention is to provide a detection system for detecting a position of a moving object based on information of a transmitter that the moving object carries while moving around in an observation area, including: a) a plurality of receivers receiving the information transmitted from the transmitter; b) means for looking into a sensitiveness level setup file including a sequence, of levels of sensitiveness to received signals transmitted from the plurality of receivers, which is a sequence expressed by values, as components, representing intensity of sensitiveness to the received signals, and setup IDs specific of the sequence of levels of sensitiveness to the received signals, and finds the sequence of levels of sensitiveness to the received signals corresponding to the setup ID; c) means for designating a specific, setup ID in order to set up levels of sensitiveness to the received signals transmitted from the plurality of receivers; d) means for receiving from the sensitiveness level setup control section a sequence of levels of sensitiveness to received signals corresponding to the specific setup ID received from the switching instruction section; and e) means for converting, for each component, a sequence of levels of sensitiveness to received signals received from the sensitiveness level switching section into signals for designating levels of sensitiveness to received signals corresponding to the respective receivers, and transmitting the signals for designating levels of sensitiveness to received signals.

A third aspect of the present invention is to provide a detection method for detecting a position of a moving object based on information of a transmitter that the moving object carries while moving around in an observation area, including: a) looking into a sensitiveness level setup file including a sequence, of levels of sensitiveness to received signals transmitted from a plurality of receivers, which is a sequence expressed by values, as components, representing intensity of sensitiveness to the received signals, and the setup IDs specific of the sequence of levels of sensitiveness to the received signals, and finding the sequence of levels of sensitiveness to the received signals corresponding to the setup ID; and b) converting, for each component, the found sequence of levels of sensitiveness to received signals into signals for designating levels of sensitiveness to received signals corresponding to the respective receivers, and transmitting the signals for designating levels of sensitiveness to received signals.

A fourth aspect of the present invention is to provide a detection computer program product to be executed by a computer for detecting a position of a moving object based on information of a transmitter that the moving object carries while moving around in an observation area, including: a) instructions configured to look into a sensitiveness level setup file including a sequence, of levels of sensitiveness to received signals transmitted from a plurality of receivers, which is a sequence expressed by values, as components, representing intensity of sensitiveness to the received signals, and the setup IDs specific of the sequence of levels of sensitiveness to the received signals, and find the sequence of levels of sensitiveness to the received signals corresponding to the setup ID; and b) instructions configured to convert, for each component, the found sequence of levels of sensitiveness to received signals into signals for designating levels of sensitiveness to received signals corresponding to the respective receivers, and transmit the signals for designating levels of sensitiveness to received signals.

BRIEF DESCRIPTION OF THE DRAWINGS

FIG. 4 is a block diagram showing a radio tag provided to a transmitter according to the first embodiment;

FIG. 5 is a block diagram of a receiver according to the first embodiment;

FIG. 6 shows an example of a sequence regarding levels of sensitiveness to received signals according to the first embodiment;

FIG. 12 shows an example of a sequence regarding abnormal situations according to the second embodiment;

FIG. 17 is a schematic view illustrating a tracing method of the walker according to the second embodiment; and FIG. 18 is a flowchart showing the tracing method of the walker according to the second embodiment.

DETAILED DESCRIPTION OF THE INVENTION

Figure 1:
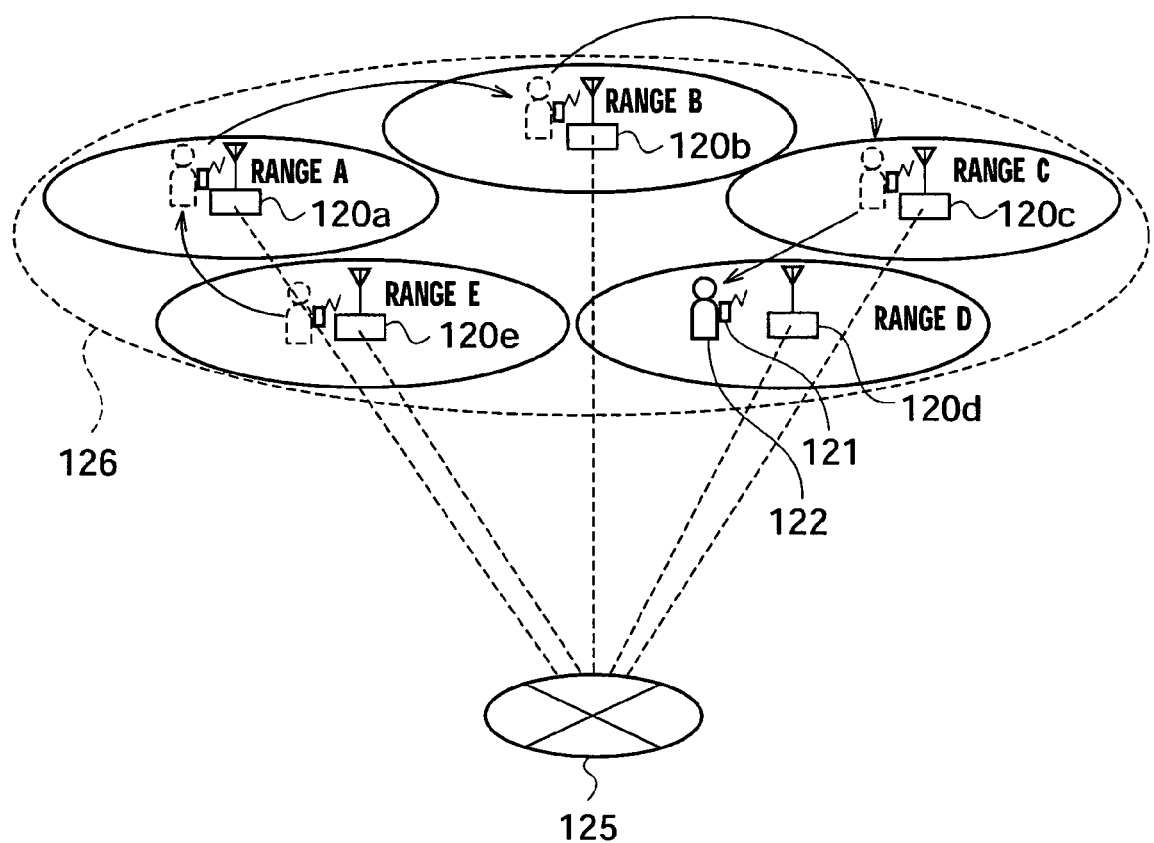
FIG. 1 is a view showing a conventional detection area.
Figure 2:
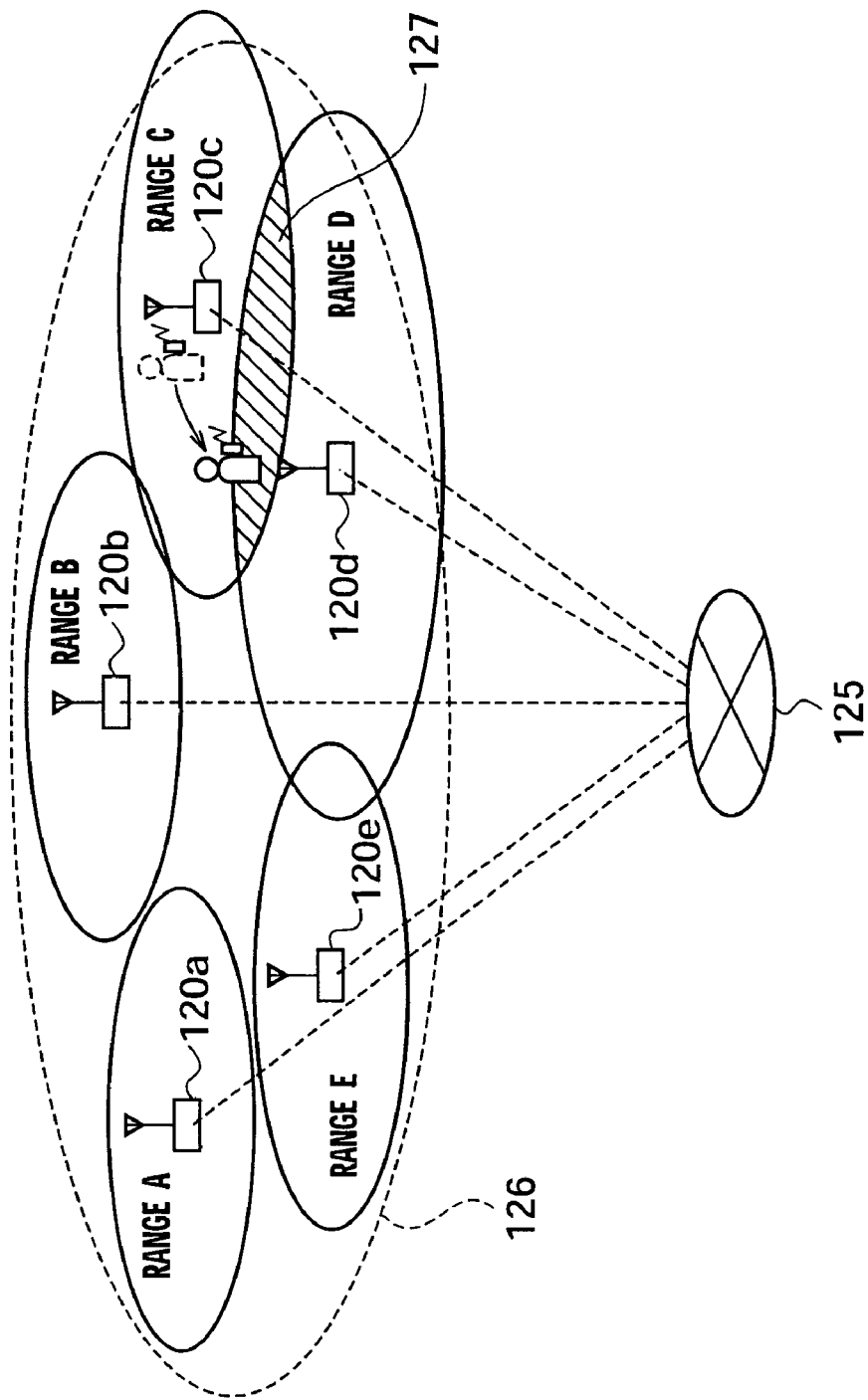
FIG. 2 is a view showing an example of a conventional crossover margin between detection areas.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In a technology for measuring a position of an object in a given space, there are various methods. Among these methods are, for example, position detection methods using a global positioning system (GPS) and using a personal handy phone system (PHS), a method using radio identification tags, a method for specifying a position based on an image of an object caught by a video camera, and the like. Among these methods, the GPS and the PHS that uses a public network are suitable mainly for detecting a position in a vast space in the open air where the coverage is not limited. On the other hand, the PHS that uses a private network, the radio tag system, the video camera and the like are suitable for detecting a position within a warehouse and in a limited area within a relatively narrow coverage.

In the case of detecting a position in a space within a limited coverage, it is necessary to arrange a detection area of each position detection mean to be suitable for detection no matter which method is employed.

First Embodiment

Description will be made of a detection system, according to a first embodiment, which changes the level of the sensitiveness for detection in accordance with a purpose of the detection, and detects a position of something (an object) to be detected, present in a space within a limited coverage as a room, a warehouse and an event hall, in accordance with the purpose of the detection.

(Receiver and Transmitter in Observation Area)

Figure 3:
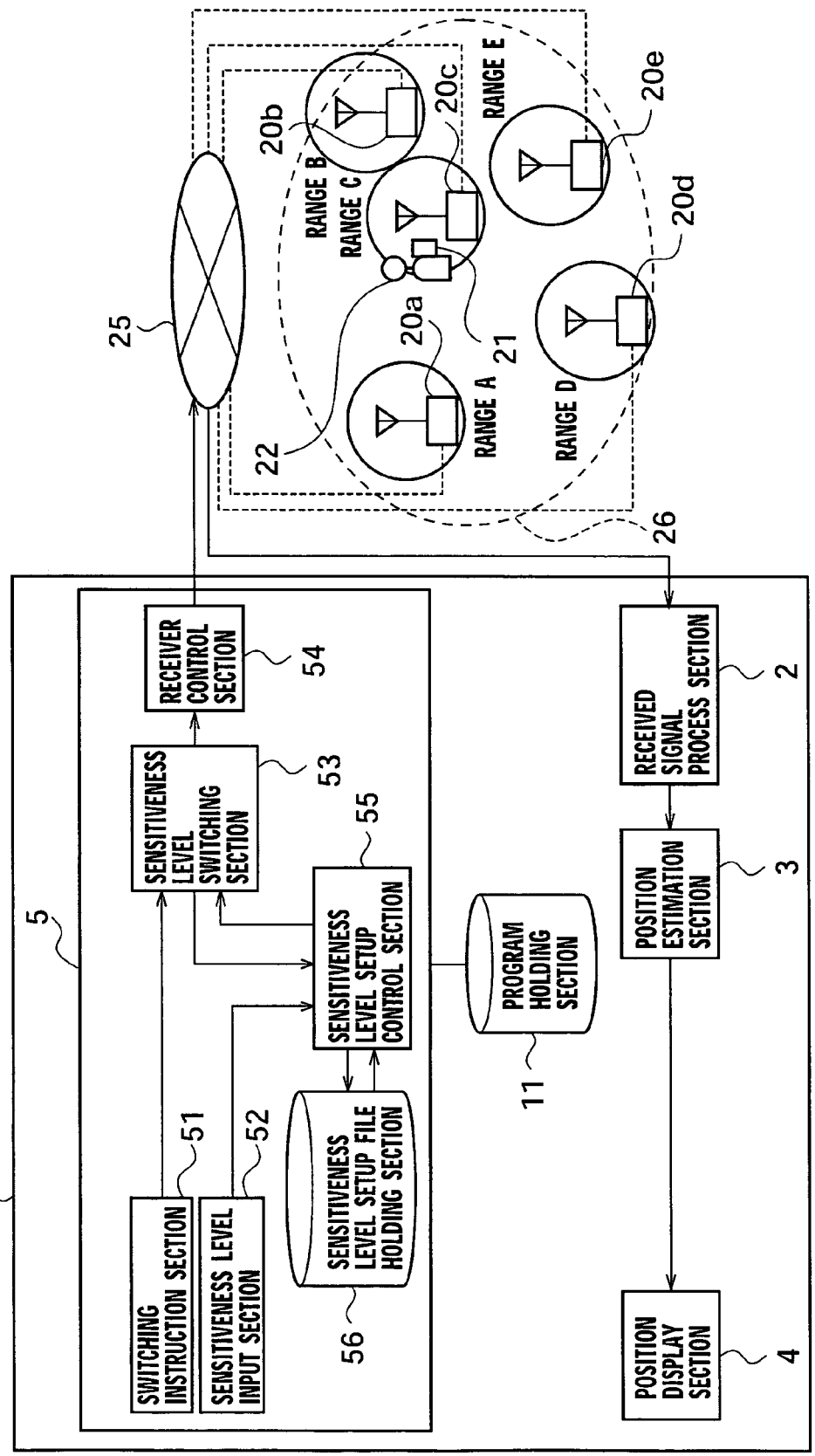
FIG. 3 is a block diagram of a detection system according to a first embodiment.

Hereinafter, by taking an example of a walker, as an object to be detected, who moves around in a given observation area, description will be made of a detection system for detecting the walker. As shown in FIG. 3, a detection system according to the embodiment of the invention detects a position of a walker 22 in a given observation area 26. Transmitters 20a, 20b, . . . , and 20e are installed in the observation area 26. Meanwhile, the walker 22, as an object to be detected, carries a transmitter 21.

Specifically, the transmitter 21 can use a radio tag or the like. The radio tag is constituted of, e.g., what is called radio frequency identification (RF-ID) and the like. As shown in FIG. 4, the radio tag includes an identification information holding section 31, for holding IDs (hereinafter referred to as "transmitter IDs",) that vary from one radio tag to another, a transmission section 32 for generating a transmitted signal of a predetermined frequency in accordance with the transmitter ID held in the identification information holding section 31, and a transmission antenna 33. The transmission section 32 generates a transmitted signal in accordance with the transmitter ID held by the identification information holding section 31, and transmits the transmitted signal through the transmission antenna 33.

Intervals at which the radio tag 30 transmits a signal in accordance with the transmitter ID is determined based on a moving speed of the walker 22, and distances between each two of the places where the receivers 20a, 20b, . . . , and 20e, are arranged. For example, the radio tag is arranged to transmit a signal once a few seconds when a person, as an object to be detected, walks around in a usual building. Otherwise, in the case of a walk around in a hall, accuracy of detecting a position of the walker 22 can be enhanced by shortening the distances between each two of the receivers 20a, 20b, . . . , and 20e to be arranged and by shortening the intervals at which the transmitted signal is transmitted in accordance with the transmitter ID. In addition, the intervals at which the radio tag transmits a signal can be adjusted by controlling the intervals at which the transmission section 32 sends the transmitted signal in accordance with the transmitter ID.

Meanwhile, the receivers 20a, 20b, . . . , and 20e also have an ID of their own. The receivers 20a, 20b, . . . , and 20e detect the transmitted signal, which contains the transmitter ID from the transmitter 21. For example, as shown in FIG. 5, a receiver 20 includes an antenna 201, a sensitiveness level attenuator 202, a reception determination section 203, and a data transfer section 204. The antenna 201 receives transmitted signals sent from a plurality of transmitters 21a, 21b, and 21c. The sensitiveness level attenuator 202 sends a transmitted signal of intensity higher than that of a predetermined transmitted signal to the reception determination section 203. The data transfer section 74 generates receiver information regarding a transmitter from which the reception determination section 203 determines that the reception determination section has reviewed the transmitted signal, and transmits the receiver information to a received signal process section 2 through a communications network 25. Here, the "receiver information" means information, which contains a detection flag indicating the transmitter 21's arrival at, or departure from, a detection area of a receiver 20, a receiver ID, and a transmitter ID. The receiver information may contain information of the time at which each of the receivers 20a, 20b, . . . , and 20e receives information from the transmitter 21. The detection areas (Area A, Area B, . . . , and Area E) of the receivers 20a, 20b, . . . , and 20e can be adjusted from the detection system 1. This adjustment will be detailed later.

(Configuration of a Detection System)

As shown in FIG. 3, a detection system 1 according to the embodiment of the invention includes: the received signal process section 2 for receiving receiver information sent from the plurality of receivers 20a, 20b, . . . , and 20e in the observation area 26 in which the walker 22 carrying the transmitter 21 moves around, through the communications network 25, and for outputting position detection data; a position estimation section 3 for estimating a current position of the walker based on the position detection data; a position display section 4 for displaying a position of the transmitter when the walker 22 moves, and reception sensitiveness level setup switching means 5 for switching the coverage of the detection areas of the receivers 20a, 20b, . . . , and 20e corresponding to situations.

The received signal process section 2 outputs data obtained by converting the receiver information received from the receivers 20a, 20b, . . . , and 20e into a format to be processed by the detection system 1. This converted data is referred to as "position detection data". When no time information is added to the receiver information, which has been received, the received signal process section 2 may convert the time information into position detection data after addition of the time information.

The position estimation section 3 includes an event queue (a queue), and sequentially stores position detection data supplied from the received signal process section 2 at the end of the event queue. The position data are taken out of the head of the event queue to form a position estimation of the walker sequentially.

The position display section 4 displays a map of the position of the transmitter 21 on an external display device (not shown) based on the position detection data received from the position estimation section 3 when the position of the walker 22 is changed. The external display device represents a screen of a monitor or the like, and a liquid crystal display device (LCD), a light emitting diode (LED) panel, an electroluminescence (EL) panel or the like can be used for the device. A printer may also be used as the external display device.

The reception sensitiveness level setup switching means 5 includes a switching instruction section 51, a sensitiveness input section 52, a sensitiveness switching section 53, a receiver control section 54, a sensitiveness level setup control section 55, and a sensitiveness level setup file holding section 56.

To begin with, a sensitiveness level setup file held by the sensitiveness level setup file holding section 56 includes a sequence of levels of sensitiveness for received signals, and setup IDs specific of the level sequence. The sequence of levels of sensitiveness to received signals is a sequence of numbers, which represents values (hereinafter referred to as "levels of sensitiveness to received signals,") indicating intensities of sensitiveness to received signals of the receivers 20a, 20b, . . . , and 20e as elements. A sequence of levels of sensitiveness to received signals $SPL_k$ is expressed by $(SPL_{k1}, SPL_{k2}, \ldots, SPL_{kN})$ when k ($1 \leq k \leq M$ (M: the number of sequences of levels of sensitiveness to received signals registered in the sensitiveness level setup file)) is an index to represent the number of sequences of levels of sensitiveness to received signals, and N represents the number of receivers. FIG. 6 shows an example of a sensitiveness level setup file. For example, it is assumed that a sequence of levels of sensitiveness to received signals in an optimal state in which no crossover area occurs in detection areas of all the receivers is stored as a setup ID "0001," a sequence of levels of sensitiveness to received signals in which the sensing level of only the receiver 1 is maximum is stored as a setup ID "0002," and a sequence of levels of sensitiveness to received signals in which the coverage of all the receivers are maximized is stored as a setup ID "0003." In this case, in a normal mode of position detection, highly accurate position detection can be pursued by setup the setup ID "0001." In the case that an abnormal situation occurs, the setup ID "0002" is chosen when the abnormality occurs in the area A, and the setup ID "0003" is chosen when the entire observation area is dangerous, the presence of a walker or the like in the dangerous area can be checked. In the description below, when referring to FIG. 6, an assumption should be noted that setup IDs thereof are set corresponding to the aforementioned states. Meanwhile, in a setup ID "000n" of FIG. 6, levels of sensitiveness to received signals of all the receivers are designated as "v". When this ID is chosen, levels of sensitiveness to received signals of each receiver is optionally set from an external input device (not shown). In an unusual situation where a level of sensitiveness to received signals for each receiver is not held in the sensitiveness level setup file, the situation can be optionally dealt with by setting the setup ID "000n".

Incidentally, the sensitiveness level setup file holding section 56 may be an internal memory device such as a RAM, or an external memory device such as an HD or an FD.

The switching instruction section 51 designates specific setup ID for setting levels of sensitiveness to received signals of the plurality of receivers. Specifically, the switching instruction section 51 receives the setup ID of a sequence of levels of sensitiveness to received signals input from an external input device (not shown), and transmits the received setup ID to the sensitiveness level switching section 53. Here, the external input device refers specifically to a keyboard, a mouse, or the like. Upon an input operation from the external input device, corresponding key information is sent to the switching instruction section 51 or the sensitiveness level input section 52. For example, when an abnormal state such as a disaster occurs in the observation area 26, a user sets the setup ID "0003" (see FIG. 6) by means of the external input device. The switching instruction section 51 can maximize the sensing levels of all the receivers by receiving the setup ID.

The sensitiveness level input section 52 creates a sequence of levels of sensitiveness to received signals based on the levels of sensitiveness to received signals of the receivers which the user inputs by using the external input device, and corresponding setup ID. Then, the sequence of levels of sensitiveness to received signals and the setup ID are sent to the sensitiveness level setup control section 55.

Based on the setup ID received from the switching instruction section 51, the sensitiveness level switching section 53 receives the sequence of levels of sensitiveness to received signals corresponding to the setup ID from the sensitiveness level setup control section 55, and transmits such sequence to the receiver control section 54.

The sensitiveness level setup control section 55 registers the sequence of levels of sensitiveness to received signals and the setup ID, which are input by the sensing input section 52, as a sensitiveness level setup file in the sensitiveness level setup file holding section 56. This registration method will be detailed later. Additionally, the sensitiveness level setup control section 55 searches the sensitiveness level setup file holding section 56 for the sequence of levels of sensitiveness to received signals corresponding to the setup ID designated by the sensitiveness level switching section 53 to send such sequence to the sensitiveness level switching section 53.

The receiver control section 54 converts the sequence of levels of sensitiveness to received signals received from the sensitiveness level switching section 53 into a levels of sensitiveness to received signals designation signal, and transmits such signal to each receiver through the communications network 25. Each receiver changes the level of sensitiveness to received signals based on the level of sensitiveness to received signals designation signal received from the receiver control section 54.

Furthermore, the detection system 1 according to the first embodiment can include a central processing unit (CPU), and can be configured by incorporating the switching instruction section 51, the sensitiveness level input section 52, the sensitiveness level switching section 53, the receiver control section 54, the sensitiveness level setup control section 55, and the like as modules. These modules can be implemented by executing a dedicated program for using a predetermined programming language on a general-purpose computer such as a personal computer.

As shown in FIG. 3, the detection system 1 may include a recording medium (a program holding section 11) for holding a program to execute a function of the sensitiveness level switching section 53 or the like. As such recording medium (the program holding section 11), for example, a hard disk, a flexible disk, a compact disk, an IC chip, a cassette tape, and the like are listed. By means of the recording medium, which holds such a program, storage, transportation, sale, and the like of the program can be facilitated. Moreover, it is possible to cause the detection system 1 to execute the aforementioned functions and a detection method to be discussed later by reading out the detection program held in such recording medium (the program holding section 11).

By means of the detection system according to the first embodiment, it is possible to switch the detection ranges of the plurality of receivers depending on situations, such as a case in which highly accurate position detection is a purpose, or a case of checking whether or not a detection target is present in the observation area.

(Detection Method)

Figure 7:
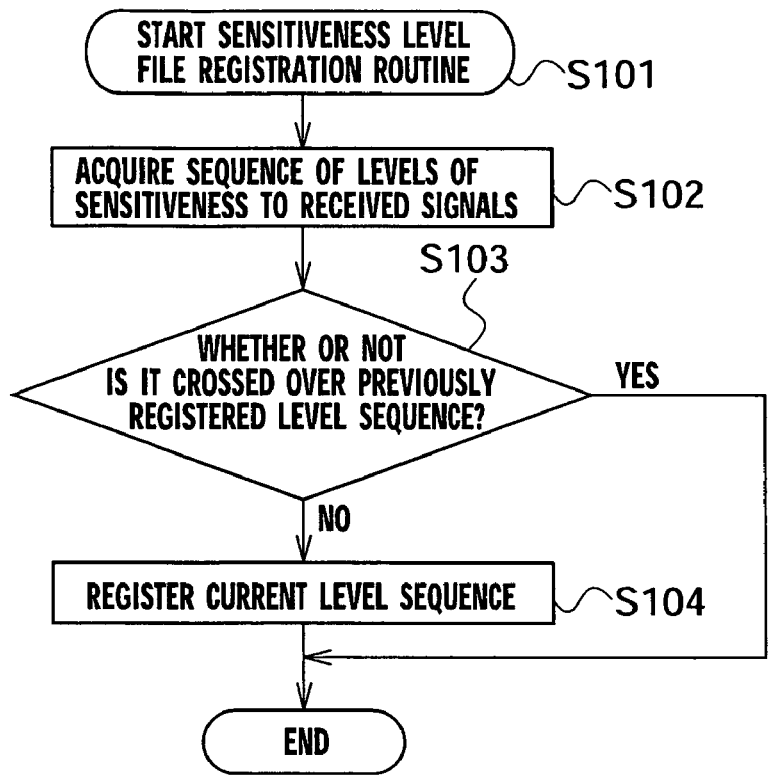
FIG. 7 is a flowchart showing a registration method of a sensitiveness-setting file according to the first embodiment.

To begin with, description will be made on a method for registering a sensitiveness level setup file by the sensitiveness level setup control section 55, using FIG. 7 and referring to FIG. 3.

(a) First, in step S101, a sensitiveness level setup file registration routine is started from the sensitiveness level input section 52. The sensitiveness level input section 52 creates a sequence of levels of sensitiveness to received signals, and setup ID unique to such sequence of the levels of sensitiveness to received signals are created based on data input by the external input device. The sequence of levels of sensitiveness to received signals and the setup ID are then sent to the sensitiveness level setup control section 55.

(b) Next, in step S102, the sensitiveness level setup control section 55 obtains the sequence of levels of sensitiveness to received signals and the setup ID input by the sensitiveness level input section 52.

(c) Then, in step S103, the sensitiveness level setup control section 55 searches the sensitiveness level setup file holding section 56 to determine whether or not the obtained sequence of levels of sensitiveness to received signals overlaps any level sequence registered in the past. When no overlapping is determined, the process proceeds to step S104 to register the obtained sequence of levels of sensitiveness to received signals and the setup ID in the sensitiveness level setup file holding section 56. When the obtained sequence of levels of sensitiveness to received signals is determined to have been registered in step S103, nothing is carried out to end the process.

Figure 8:
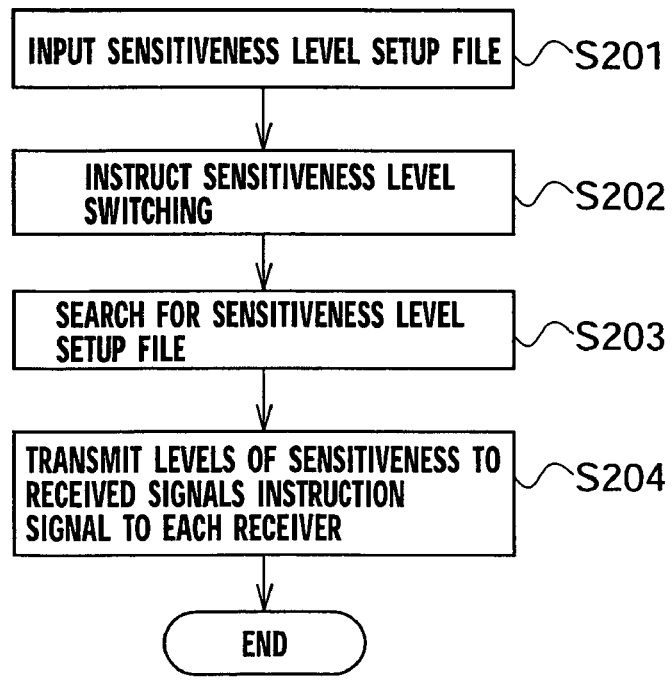
FIG. 8 is a flowchart showing a detection method according to the first embodiment.

Next, the detection method according to the first embodiment will be described by use of FIG. 8, referring to FIG. 3.

(a) First, in step S201, a sensitiveness level setup file is registered in the sensitiveness level setup file holding section 56 in advance by means of the method described above with reference to FIG. 7 or the like. Meanwhile, the position display section 4 maps the positions of the transmitter 21 on the external display device (not shown) based on position detection data received from the position estimation section 3 when the position of the walker 22 is changed. In this case, the received signal sensing ranges of the receivers 20a, 20b, . . . , 20e are also displayed on the external display device. Specifically, for example, as shown in FIG. 3, a received signal sensing range may be displayed as a circle, which surrounds a receiver. Such received signal sensing range may be narrowed depending on conditions such as the presence of an object, e.g. a metal, which absorbs a transmission signal in a surrounding environment. Alternatively, there is a case in which expansion of the sensing range is needed when an abnormal situation occurs in the observation area 26.

(b) When a situation changes as described above, a reception range must be set with respect to each of the receivers 20a, 20b, . . . , 20e depending on situations. Setup ID corresponding to a sequence of levels of sensitiveness to received signals to be set is input to the switching instruction section 51 by means of the external input device. For example, setup ID "0002" (see FIG. 6) is input in the case of expanding the reception range of the area A. Setup ID "0003" (see FIG. 6) is set when a disaster occurs which can endanger the entire observation area. Then, in step S202, the switching instruction section 51 receives the setup ID, and transmits it to the sensitiveness level switching section 53.

(c) Subsequently, the sensitiveness level switching section 53 sends the setup ID designated by the switching instruction section 51 to the sensitiveness level setup control section 55. In step S203, the sensitiveness level setup control section 55 searches the sensitiveness level setup file holding section 56 for a sequence of levels of sensitiveness to received signals corresponding to the setup ID designated by the sensitiveness level switching section 53. Then, such sequence of levels of sensitiveness to received signals is transmitted to the sensitiveness level switching section 53.

(d) Next, the sensitiveness level switching section 53 sends the sequence of levels of sensitiveness to received signals received from the sensitiveness level setup control section 55 to the receiver control section 54. In step S204, the receiver control section 54 converts such sequence of levels of sensitiveness to received signals into a level of sensitiveness to received signals designation signal, and transmits it to each receiver. Each receiver changes a level of sensitiveness to received signals based on the level of sensitiveness to received signals designation signal received from the receiver control section 54.

Figure 9:
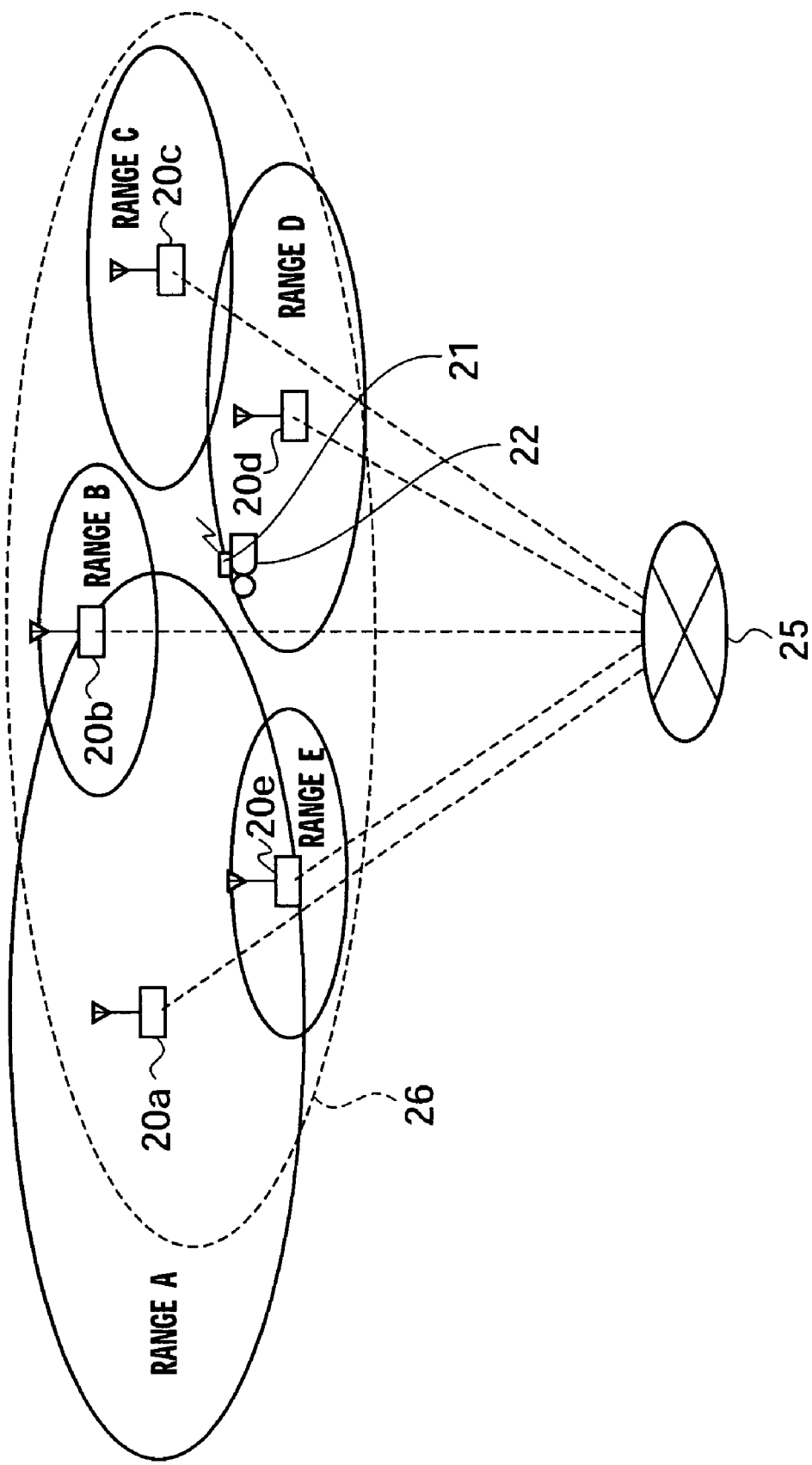
FIG. 9 is a view showing an example of an observation area when a level of the sensitiveness of a certain receiver is maximized.

By means of the detection method of the first embodiment, the level of sensitiveness to received signals of each receiver can be changed depending on situations. As an example, FIG. 9 shows a state in the observation area when the setup ID "0002" (see FIG. 6) is input. When an abnormal situation occurs in the area A, for example, when the receiver 20a detects the walker 22 though the area A is off-limits, setup ID can be input from the switching instruction section 51 to maximize only the level of sensitiveness to received signals of the receiver 20a.

Figure 10:
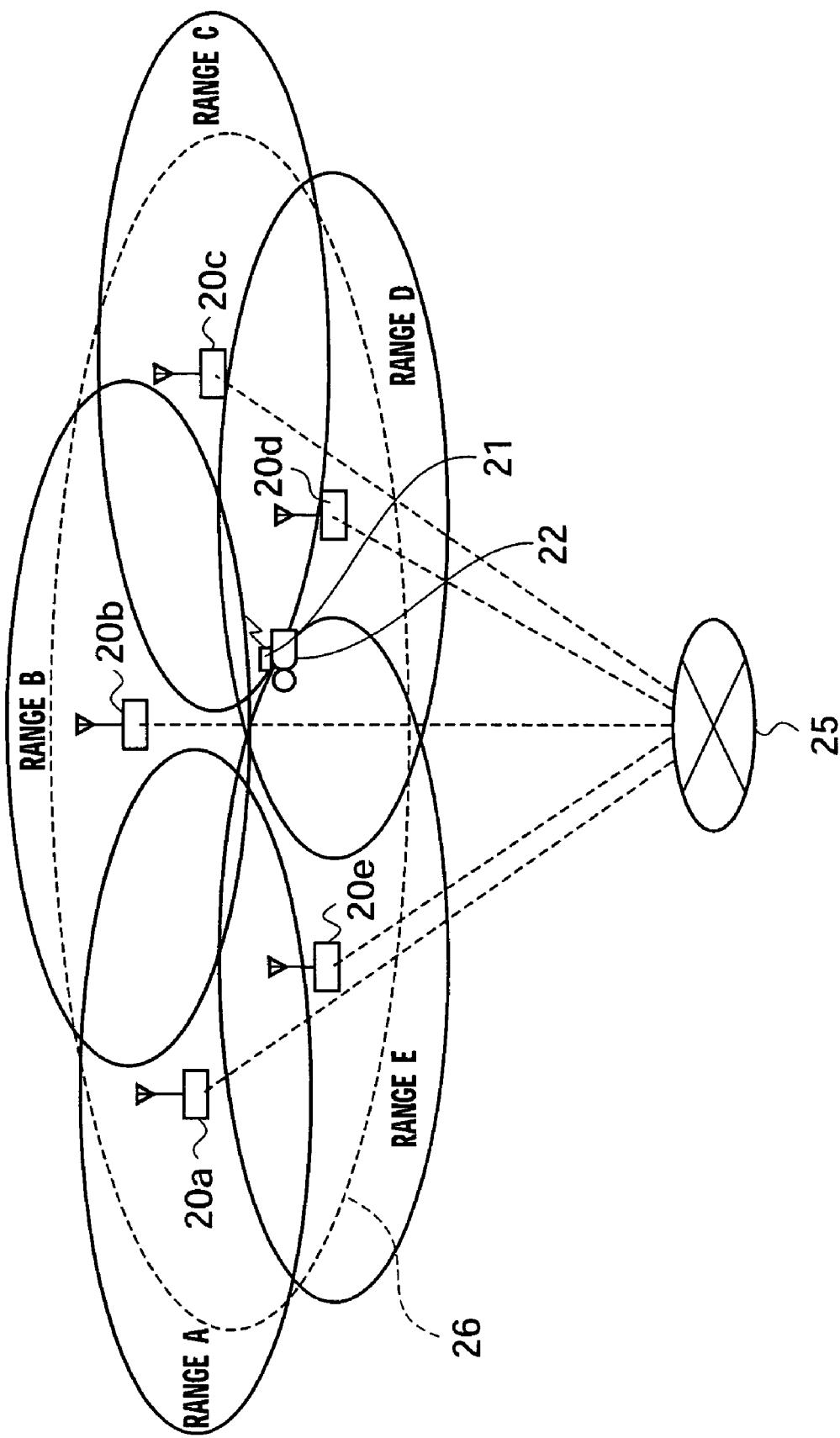
FIG. 10 is a view showing an example of an observation area when levels of the sensitiveness of all the receivers are maximized.

FIG. 10 shows a state in the observation area when the setup ID "0003" (see FIG. 6) is input. When the entire observation area 26 is in a dangerous state, it is essential to instantly make sure whether or not there is a walker therein. In this case, the level of sensitiveness to received signals of each of the receivers 20a, 20b, . . . , 20e in the observation area 26 is maximized. In emergency, there is no need to distinguish positions by the detection areas of the receivers. It is only necessary to identify a signal issued from the transmitter 21 in the observation area 26. Conventionally, it has been necessary for a person to actually patrol such area to make sure that it is safe. However, by means of the detection method of the first embodiment, it is possible to safely and instantly check the presence of a walker without patrolling by a person.

Therefore, by means of the detection method of the first embodiment, it is possible to easily switch detection accuracy depending on situations, such as a case in which highly accurate position detection is intended, or a case of checking whether or not there is a detection target in the observation area. Moreover, since the reception range of the existing receiver is changed to execute detection, it is not necessary to equip checking means such as a camera for a safety check purpose. Thus, it is possible to obtain location information at a lower cost.

Second Embodiment

In a second embodiment, description will be made on a system which, when an abnormal situation is detected, automatically sets the sensitiveness level of a receiver in response to such abnormal situation, in addition to the detection system of the first embodiment. A receiver and a transmitter in an observation area are similar to those of the first embodiment.

(Configuration of Detection System)

Figure 11:
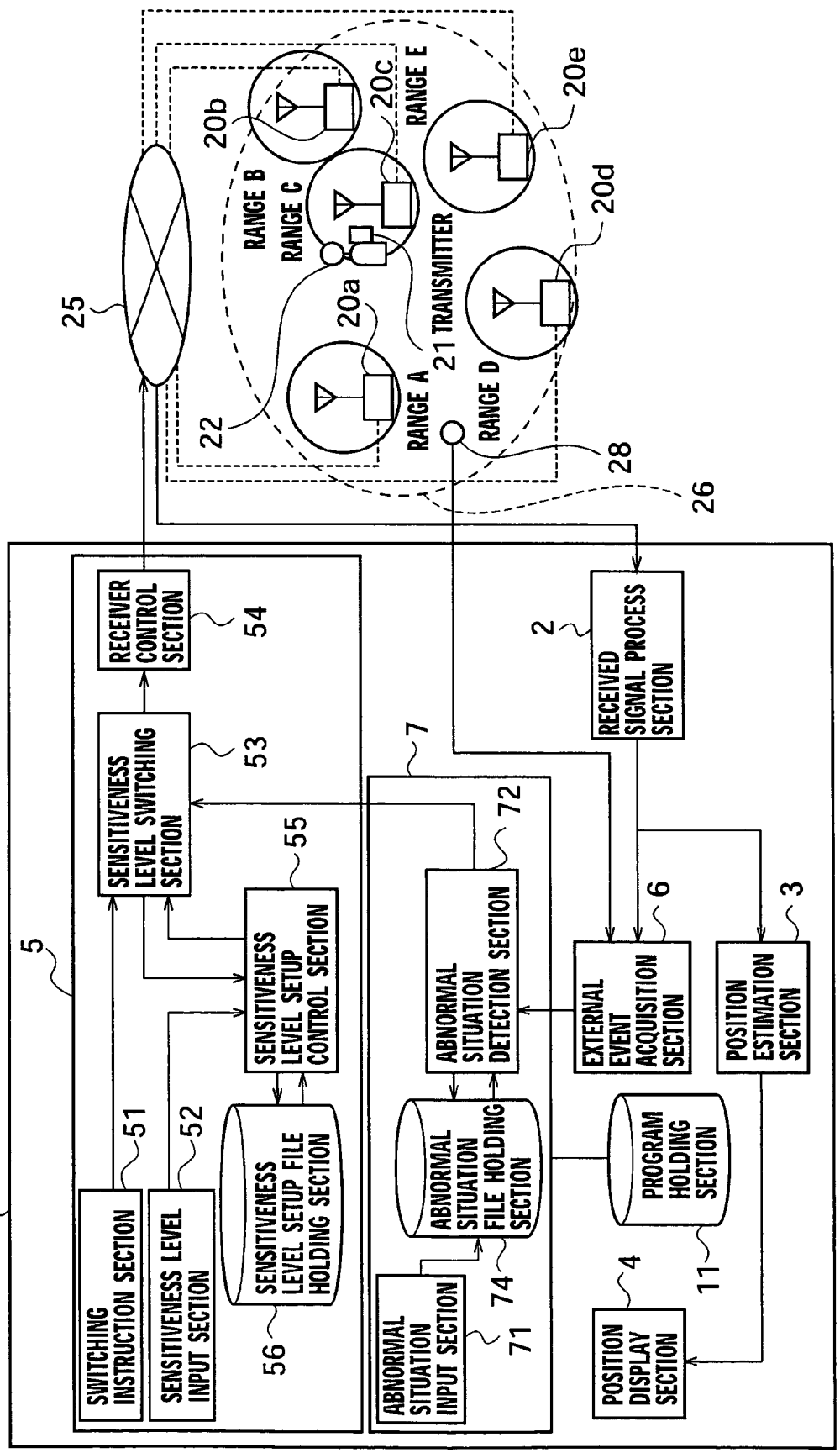
FIG. 11 is a block diagram of a detection system according to a second embodiment.

As shown in FIG. 11, the detection system of the second embodiment includes a received signal processing section 2 for receiving receiver information sent from a plurality of receivers 20a, 20b, . . . , 20e of an observation area 26 in which a walker 22 carrying a transmitter 21 moves through a communications network 25, and outputting position detection data, a position estimation section 3 for estimating a current position of the walker based on the position detection data, a position display section 4 for displaying a position of the transmitter when the walker 22 moves, reception sensitiveness level setup switching means 5 for switching the ranges of detection areas of the receivers 20a, 20b, . . . , 20e depending on situations, an external event acquisition section 6 for generating a trigger when there is a change from the last position detection data based on the position data received from the received signal processing section 2, and an abnormal time sensitiveness level switching means 7 for automatically switching the ranges of the detection areas of the receivers 20a, 20b, . . . , 20e when an abnormal situation is detected from the external event acquisition section 6.

The received signal processing section 2 outputs data obtained by converting the receiver information received from the receivers 20a, 20b, . . . , 20e into a form which can be processed in the detection system 1, to the position estimation section 3 and the external event acquisition section 6. Such converted data is referred to as "position detection data". When no time information is added to the received receiver information, the received signal processing section 2 may add time information. Here, the "receiver information" is information, which contains a detection flag, receiver ID, and transmitter ID as described above. According to the second embodiment, a level of sensitiveness to received signals of the receiver may be contained.

The position estimation section 3 and the position display section 4 are similar to those of the first embodiment, and thus description thereof will be omitted.

The external event acquisition section 6 processes the position detection data received from the received signal processing section 2, and acquires such position detection data when there is a change from the last position detection data. Then, a trigger is generated to send such position detection data to an abnormal situation detection section 72 of the abnormal time sensitiveness level switching means 7. The time when a change occurs in the position detection data refers to a time when a walker arrives/departs in/from of a given area. Additionally, the external event acquisition section 6 monitors an emergency button and an external sensor 28 of a gauge, such as a voltmeter or a thermometer, installed in the observation area 26, and acquires the value of such gauge even when a change occurs in a state of the external sensor 28. Then, a trigger is generated to transmit the state of the external sensor 28 to the abnormal situation detection section 72 of the abnormal time switching means 7. The time when a change occurs in the state of the external sensor 28 refers to a time when the value of such gauge is changed or the emergency button is depressed.

The abnormal time sensitiveness level switching means 7 includes the abnormal situation input section 71, the abnormal situation detection section 72, and an abnormal situation file holding section 74.

An abnormal situation file held by the abnormal situation file holding section 74 is a file in which an abnormal situation and setup ID of a sequence of levels of sensitiveness to received signals of the receiver which is applied when such abnormal situation occurs are recorded. The "abnormal situation" refers to abnormal situations such as a case in which a walker present in the observation area 26 is not detected, a case in which the emergency button installed in the observation area 26 is depressed, or a case in which the gauges such as a voltmeter and a thermometer installed in the observation area indicate usually impossible values. As shown in FIG. 12, the abnormal situation file contains, for example, a sequence of abnormal situations $ES_1$ ($1 \leq l \leq N$, N: the number of registered abnormal situation sequences) which is a sequence of numbers expressing values which indicate abnormal conditions of the receivers or the external sensors as elements, and setup ID unique to the sequence of levels of sensitiveness to received signals which is set when the abnormal situation occurs. Kinds of sensors include a level of sensitiveness to received signals of each receiver, information on depressing of the emergency button, a current or a voltage of the gauges, and the like. As shown in FIG. 12, for example, when a sensor 1 is a voltmeter, a sensor 2 is a thermometer, and a sensor n is an emergency button, then a value of the voltmeter is set to 500 V or lower, or 1500 V or higher, a value of the thermometer is set to 15° C. or lower, or 100° C. or higher and, when the emergency button is depressed, a level of sensitiveness to received signals sequence of the setup ID "0010" is set in each receiver.

The abnormal situation input section 71 creates a sequence of abnormal situations based on the sensor values which the user inputs by using the external input device, and setup ID of a sequence of levels of sensitiveness to received signals which is set when any of such abnormal situations occurs. Then, the sequence of abnormal situations and the setup ID are registered in the abnormal situation holding section 74. Here, the external input device refers specifically to devices such as a keyboard, a mouse or the like. Upon an input operation from the external input device, corresponding key information is sent to the abnormal situation input section 71.

The abnormal situation detection section 72 receives position detection data or a state of the external sensor 28 from the external event acquisition section 6. That is, when a change is detected in the position detection data or the situation of the external sensor 28 (gauge data of a plant or the like), the position detection data or the value of the external sensor 28 is received. The abnormal situation detection section 72 searches the abnormal situation file holding section 74 for a level of sensitiveness to received signals contained in the position detection data or a state of the external sensor 28 (information on depressing of the emergency button, a current or voltage value of a gauge or the like) to determine whether or not such level or state corresponds to a preset abnormal state. When such level or state corresponds to the designated sequence of abnormal situations, the abnormal situation detection section 72 outputs setup ID of a sequence of levels of sensitiveness to received signals corresponding to the abnormal situation to the sensitiveness level switching section 53. Incidentally, it has been mentioned that the information contained in the position detection data is used for the level of sensitiveness to received signals. In the detection system 1, however, when a current receive signal sensing level of each receiver is held, the value of such level should be referenced, and the position detection data may not always contain the level of sensitiveness to received signals.

The sensitiveness level switching section 53 sends setup ID designated by the abnormal situation detection section 72 to the sensitiveness level setup control section 55. The sensitiveness level setup control section 55 searches the sensitiveness level setup file holding section 56 for a sequence of levels of sensitiveness to received signals corresponding to the setup ID designated by the sensitiveness level switching section 53, and transmits it to the sensitiveness level switching section 53. Then, as in the first embodiment, the sensitiveness level switching section 53 sends the sequence of levels of sensitiveness to received signals to the receiver control section 54. The receiver control section 54 converts the sequence of levels of sensitiveness to received signals received from the sensitiveness level switching section 53 into a level of sensitiveness to received signals designation signal, and transmits such signal to each receiver through the communications network 25. Each receiver changes the level of sensitiveness to received signals based on the level of sensitiveness to received signals designation signal received from the receiver control section 54.

Furthermore, as is the case with the first embodiment, the detection system 1 of the second embodiment can include a central processing unit (CPU) and can be configured by incorporating the abnormal situation input section 71, the abnormal situation detection section 72, and the like as modules. These modules can be implemented by executing a dedicated program for using a predetermined programming language on a general-purpose computer such as a personal computer.

As shown in FIG. 9, the detection system 1 may include a recording medium (the program holding section 11) for holding a program to execute functions of the abnormal situation detection section 72 or the like. As such recording medium (the program holding section 11), for example, a hard disk, a flexible disk, a compact disk, an IC chip, a cassette tape, and the like are listed. By means of the recording medium, which holds such a program, storage, transportation, sale, and the like of the program can be facilitated. Moreover, it is possible to cause the detection system 1 to execute the aforementioned functions and a detection method to be discussed later by reading out the detection program held in such recording medium (the program holding section 11).

By means of the detection system of the second embodiment, it is possible to automatically switch the detection ranges of the plurality of receivers to ones which are suited to an abnormal situation when such abnormal situation occurs.

(Detection Method)

Figure 13:
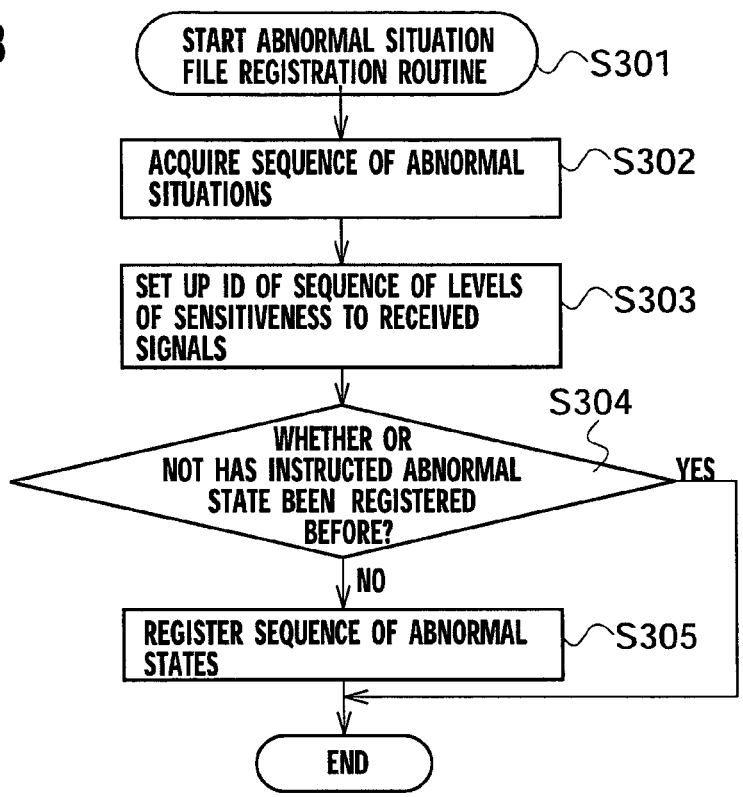
FIG. 13 is a flowchart showing a registration method of the sequence of abnormal situations according to the second embodiment.

To begin with, description will be made on a method for registering an abnormal situation file other than registration by the abnormal situation input section 71. With regard to this registration method, description will be made on automatic registration, which is carried out when the abnormal time sensitiveness level switching means 7 obtains a sequence of abnormal situations, using FIG. 13 and referring to FIG. 11.

(a) First, in step S301, an abnormal situation file registration routine is started from the abnormal situation input section 71.

(b) Next, in step S302, the abnormal situation detection section 72 obtains a sequence of abnormal situations input from the external event acquisition section 6. That is, values of sensors of kinds registered in the abnormal situation file such as levels of sensitiveness to received signals or a state of the external sensor 28 are obtained. Then, in step S303, setup ID of a sequence of levels of sensitiveness to received signals to be set corresponding to such sequence of abnormal situations is set. Such setup ID may be automatically given by the abnormal situation detection section 72, or designated by an external input device.

(c) Next, in step S304, the abnormal situation detection section 72 determines whether or not the obtained sequence of abnormal situations has been registered in the abnormal situation file holding section 74 in the past. When no past registration is determined, the process proceeds to step S305 to register the sequence of abnormal situations and the setup ID in the abnormal situation file holding section 74. When past registration is determined in step S304, nothing is carried out to end the process.

Figure 14:
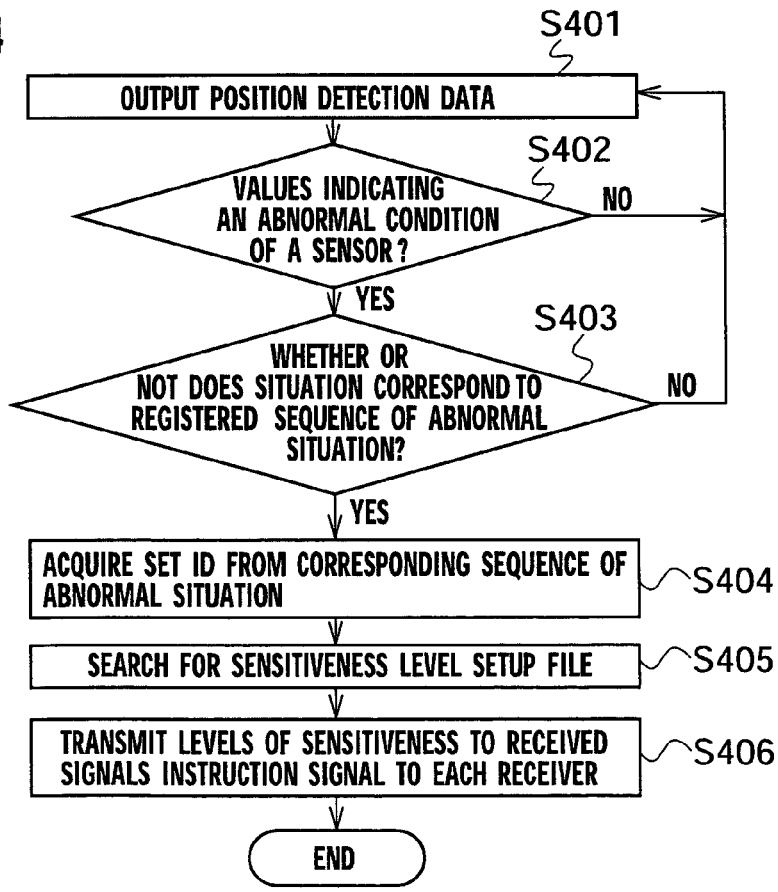
FIG. 14 is a flowchart showing a detection method according to the second embodiment.

Next, the detection method of the second embodiment will be described using FIG. 14 and referring to FIG. 11.

(a) First, in step S401, the external event acquisition section 6 outputs position detection data obtained by converting information received from the received signal processing section 2 into so formatted information that can be processed by the system. In step S402, when the position detection data are what immediately previous data have been changed into, the external event acquisition section 6 recognizes the values changed in the data as values indicating an abnormal condition of a sensor, and generates a trigger to send the position detection data to the abnormal situation detection section 72. When an abnormality occurs in the external sensor 28, the external event acquisition section 6 recognizes the values changed in the data as values indicating an abnormal condition of a sensor, and generates a trigger to transmit the state of the external sensor 28 to the abnormal situation detection section 72.

(b) Next, in step S403, the abnormal situation detection section 72 searches the abnormal situation file holding section 74 to determine whether or not the received abnormal state corresponds to the predetermined sequence of abnormal situations. That is, a sensor contained in the abnormal situation file is selected based on the received position detection data or the state of the external sensor 28, and determination is made as to whether or not the value of such sensor corresponds to any value indicated in the sequence of abnormal situations.

(c) When no correspondence is determined in step S403, the process returns to step S401 to wait for a trigger generated from the external event acquisition section 6. When correspondence is determined in step S403, the process proceeds to step S404. The abnormal situation detection section 72 acquires setup ID of a sequence of levels of sensitiveness to received signals to be set from the abnormal situation file holding section 74, and transmits the setup ID to the sensitiveness level switching section 53. In step S405, the sensitiveness level switching section 53 receives the corresponding sequence of levels of sensitiveness to received signals from the sensitiveness level setup control section 55 based on the setup ID designated by the abnormal situation detection section 72.

(d) Next, the sensitiveness level switching section 53 sends the sequence of levels of sensitiveness to received signals to the receiver control section 54. In step S406, the receiver control section 54 converts the sequence of levels of sensitiveness to received signals received from the sensitiveness level switching section 53 into a level of sensitiveness to received signals designation signal, and transmits such signal to each receiver through the communications network 25. Each receiver changes a level of sensitiveness to received signals based on the level of sensitiveness to received signals designation signal received from the receiver control section 54.

By means of the aforementioned detection method, it is possible to automatically change detection ranges of the plurality of receivers depending on situations such as a case in which highly accurate position detection is intended, or a case of checking whether or not there is a detection target in the observation area.

For example, a sequence of abnormal situations is pre-registered so that a system which has been set until then to execute highly accurate position detection can be automatically set to check on presence/non-presence of a worker when a fire detector is activated. Thus, information regarding safety in emergency can be easily obtained.

Additionally, the detection system of the second embodiment may be used when a movement of a given transmitter is traced. Hereinafter, a moving object that carries a transmitter to be traced will be referred to as a "traced moving object".

Figures 15, 16:
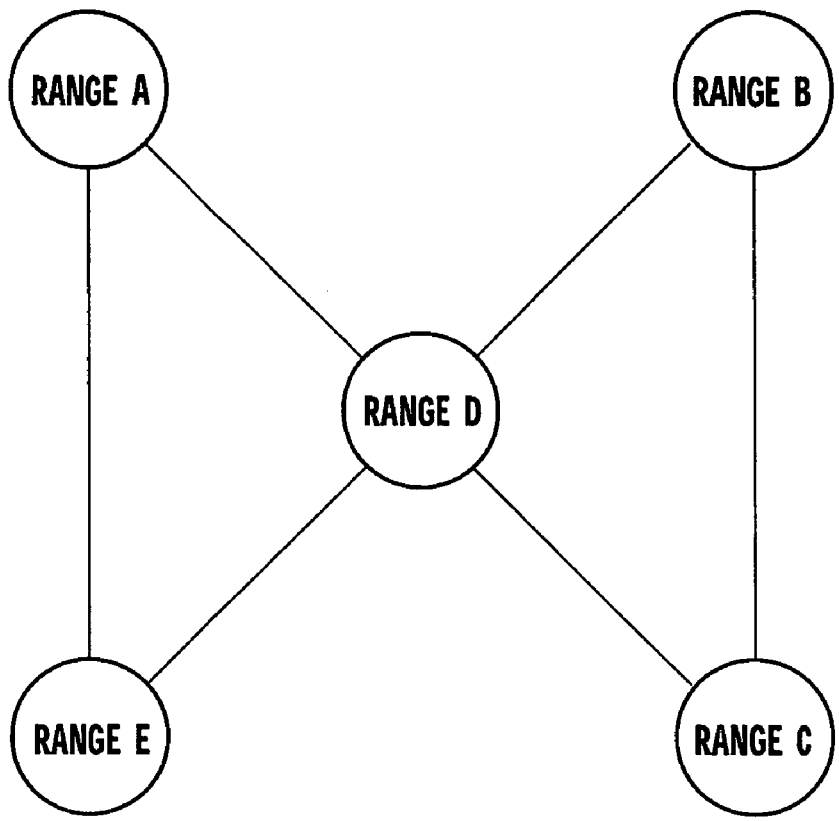
FIG. 15 is a schematic view illustrating a movable area of a walker according to the second embodiment.
FIG. 16 is an OD table illustrating areas adjacent to a current position according to the second embodiment.

When tracing the moving object, a case in which no receivers receive a signal of the transmitter is regarded as an abnormal state, and sensitiveness level of a receiver of an area in which the transmitter was present at the end, or a plurality of receivers adjacent to the receiver is increased. The detection system of the second embodiment has adjacent area information shown in FIG. 15 as adjacent information between the areas. FIG. 16 shows data into which the adjacent information of FIG. 15 is formed on an OD table. In FIGS. 15 and 16, an area A is adjacent to areas D and E, an area B is adjacent to areas C and D. And, the area C is adjacent to the areas B and D, the area D is adjacent to the areas A, B, C, and E, and the area E is adjacent to the areas A and D.

Hereinafter, a tracing method of the moving object will be described using FIG. 18 and referring to FIG. 17. In FIGS. 17 and 18, it is assumed that the traced moving object is a walker who moves in the observation area.

(a) First, in step S501, the abnormal situation detection section 72 receives a trigger generated due to a situational change from the external event acquisition section 6. That is, it is detected that the walker has arrived/departed in/from a given area. Then, in step S502, determination is made as to whether or not the walker is present in a detection area. For example, in FIG. 17, it is assumed that the traced moving object, which has been detected in the area B, is not detected. In this case, the process proceeds to step S503 to determine whether or not level of sensitiveness to received signals of an area in which such object has been present immediately before is maximized. When the level of sensitiveness to received signals of the area B is not maximized, the process proceeds to step S504 to increase the level of sensitiveness to received signals of the area B by 1. Then, the process proceeds to step S505 to place a flag (referred to as a "tracing flag", hereinafter) which indicates to the receiver of the area B that tracing is on-going internally, and the abnormal state detection section 72 maintains this flag. Subsequently, the process returns to step S502 again.

(b) When the level of sensitiveness to received signals of the area B becomes maximized by repeating the steps S502 to S504, the process proceeds from step S503 to step S507 to determine whether or not a level of sensitiveness to received signals of a receiver of an adjacent area is maximized. In FIG. 17, determination is made as to whether or not the levels of sensitiveness to received signals of the areas C and D are maximized. When maximized, the process returns to step S501 to wait for reception of a trigger. When not maximized, the process proceeds to step S508 to increase the levels of sensitiveness to received signals of the adjacent areas (the areas C and D).

(c) Next, the process proceeds to step S509 to place a tracing flag toward the receiver of the adjacent area. Proceeding to step S510, determination is made as to whether or not a walker is present in a reception range of the receiver. When not present, the process returns to step S507 to repeat the steps S507 to S510 until the level of sensitiveness to received signals of the adjacent area becomes maximized or the walker is detected in the reception range.

(d) In step S510, when any walker is present, the process proceeds to step S511 to place a tracing flag, and to return the level of sensitiveness to received signals of the receiver, which has not detected any walker to the original one. In FIG. 17, the receiver of the area D detects a walker while the receiver of the area C has not. Accordingly, the level of sensitiveness to received signals of the receiver of the area C is returned to the original level of sensitiveness to received signals. Subsequently, in step S512, the tracing flag of the receiver, which has not detected any walker, is taken back. In FIG. 17, the tracing flag of the receiver of the area C is taken back.

In the abovementioned detection method, as described with reference to FIG. 14, the abnormal situation detection section 72 searches the abnormal situation file holding section 74 for the corresponding setup ID of the sequence of levels of sensitiveness to received signals. And the abnormal situation detection section 72 transmits the setup ID to the sensitiveness level switching section 53, whereby a level of sensitiveness to received signals designation signal is set in each receiver.

By means of the abovementioned detection method, it is possible to highly accurately detect a specific traced moving object by automatically switching the detection ranges of the plurality of receivers.

(Other Embodiments)

While the present invention has been described using the first and second embodiments, it should be understood in no way that the description and the drawings, which form part of the present disclosure, limit the invention. It will be apparent to those skilled in the art that various alternative embodiments, embodiments, and operation technologies can be employed from the present disclosure.

For example, in the embodiments of the invention, it has been mentioned that the moving object, which moves in the observation area, is a walker. Needless to say, however, the moving object is not limited to the walker.

In the embodiments of the invention, description has been made on a case in which the radio tag system is employed as position detection means. However, even a radio system such as the PHS can be applied on the same principle. In the embodiments of the invention, position detection only in a 2-dimensional space has been mentioned. However, it is obvious that the position detection can be expanded to a 3-dimensional space.

Additionally, in the embodiments of the invention, it has been mentioned that the switching instruction section 51 or the like carries out the switching between the normal position detection mode and the abnormal state mode. However, a simple switch may be provided to the detection system to mechanically switch the modes.

Furthermore, in the embodiments of the invention, it has been mentioned that the sensitiveness level setup file holding section 56 and the abnormal situation file holding section 74 are separately held. However, these sections may be held in one memory device.

Various modifications will become possible for those skilled in the art after receiving the teachings of the present disclosure without departing from the scope thereof.

What is claimed is:

1. A detection system for detecting a position of a moving object based on information about a transmitter that the moving object carries while moving around in an observation area, comprising:

a plurality of receivers receiving the information transmitted from the transmitter;

a sensitive level setup control section which looks into a sensitiveness level setup file, including a sequence of levels of sensitiveness to received signals transmitted from the plurality of receivers, which is a sequence expressed by values, as components, representing intensity of sensitiveness to the received signals, and setup IDs specific of the sequence of levels of sensitiveness to the received signals, and finds the sequence of levels of sensitiveness to the received signals corresponding to the setup ID;

a switching instruction section, which designates a specific setup ID in order to set up levels of sensitiveness to the received signals transmitted from the plurality of receivers;

a sensitiveness level switching section which receives from the sensitiveness level setup control section a sequence of levels of sensitiveness to received signals corresponding to the specific setup ID received from the switching instruction section;

a receiver control section which converts, for each component, a sequence of levels of sensitiveness to received signals received from the sensitiveness level switching section into signals for designating levels of sensitiveness to received signals corresponding to the respective receivers, and transmits the signals for designating levels of sensitiveness to received signals;

a received signal process section which receives receiver information transmitted from the receivers;

an external event acquisition section which receives the receiver information as position detection data, and acquires changed values in the position detection data when any changes occur in the position detection data; and an abnormal situation detection section which looks into an abnormal situation file, registered in advance, which includes a sequence of abnormal situations and a setup ID specific to the sequence of levels of sensitiveness to received signals which is set when an abnormal situation listed in the sequence of abnormal situations occurs, and finds, when there is a sequence of abnormal situations corresponding to the changed values in the an abnormal situation file, a setup ID specific of a sequence of levels of sensitiveness to received signals corresponding to the sequence of abnormal situations.

2. The detection system of claim 1, wherein the sensitiveness level setup control section registers a sequence of levels of sensitiveness to received signals and the setup IDs specific to the sequence of levels of sensitiveness to received signals with the sensitiveness level setup file.

3. The detection system of claim 1, wherein, when a change takes place in the situation of an external sensor installed in the observation area, the external event acquisition section acquires the changed values.

4. A detection method for detecting a position of a moving object based on information about a transmitter that the moving object carries while moving around in an observation area, comprising:

looking into a sensitiveness level setup file, including a sequence of levels of sensitiveness to received signals transmitted from a plurality of receivers, which is a sequence expressed by values, as components, representing intensity of sensitiveness to the received signals, and the setup IDs specific of the sequence of levels of sensitiveness to the received signals, and fining the sequence of levels of sensitiveness to the received signals corresponding to the setup ID;

converting, for each component, the found sequence of levels of sensitiveness to received signals into signals for designating levels of sensitiveness to received signals corresponding to the respective receivers, and transmitting the signals for designating levels of sensitiveness to received signals;

registering an abnormal situation file which includes a sequence of abnormal situations and the setup ID that is set when an abnormal situation listed in the abnormal situation file takes place, outputting position detection data converted from information received from the receiver, the position detection data being formatted to be processed by the system;

recognizing the values changed in the data as values indicating an abnormal condition of a sensor, when the position detection data are what previous data have been changed into; and acquiring the setup ID that is set when a sequence of abnormal situations takes place corresponding to the values indicating an abnormal condition of the sensor, from the abnormal situation file.

5. The detection method of claim 4, further comprising:
registering the sequence of levels of sensitiveness to received signals and the setup IDs specific to the sequence of levels of sensitiveness of received signals with the sensitiveness level setup.

6. The detection method of claim 4, wherein, the step for recognizing the values changed in the data as values indicating an abnormal condition of a sensor, when a change takes place in the condition of an external sensor that has been installed in the observation area.

7. The detection method of claim 4, wherein, when an abnormal situation in which a designated moving object can not be detected in the observation area, the step for acquiring the setup ID, specific of a sequence of levels of sensitiveness to received signals, for raising the level of sensitiveness to received signals of a receiver in a detection range where the designated moving object has been present before, or in detection ranges adjacent thereto.

8. A detection computer program product to be executed by a computer for detecting a position of a moving object based on information about a transmitter that the moving object carries while moving around in an observation area, comprising:

instructions configured to look into a sensitiveness level setup file, including a sequence of levels of sensitiveness to received signals transmitted from a plurality of receivers, which is a sequence expressed by values, as components, representing intensity of sensitiveness to the received signals, and the setup IDs specific to the sequence of levels of sensitiveness to the received signals, and find the sequence of levels of sensitiveness to the received signals corresponding to the setup ID;

instructions configured to convert, for each component, the found sequence of levels of sensitiveness to received signals into signals for designating levels of sensitiveness to received signals corresponding to the respective receivers, and transmit the signals for designating levels of sensitiveness to received signals;

instructions configured to register an abnormal situation file which includes a sequence of abnormal situations and the setup ID that is set when an abnormal situation listed in the abnormal situation file takes place, instructions configured to output position detection data converted from information received from the receiver, the position detection data being formatted to be processed by the system;

instructions configured to recognize the values changed in the data as values indicating an abnormal condition of a sensor, when the position detection data are what previous data have been changed into; and instructions configured to acquire the setup ID that is set when a sequence of abnormal situations takes place corresponding to the values indicating an abnormal condition of the sensor, from the abnormal situation file.

9. The detection computer program product of claim 8, further comprising:
instructions configured to register the sequence of levels of sensitiveness to received signals and the setup IDs specific to the sequence of levels of sensitiveness to received signals with the sensitiveness level setup file.

10. The detection computer program product of claim 8, wherein, the instructions configured to recognize the values changed in the data as values indicating an abnormal condition of a sensor, when a change takes place in the condition of an external sensor that has been installed in the observation area.

11. The detection computer program product of claim 8, when an abnormal situation in which a designated moving object can not be detected in the observation area, instructions configured to acquire the setup ID, specific of a sequence of levels of sensitiveness to received signals, for raising the level of sensitiveness to received signals of a receiver in a detection range where the designated moving object has been present before, or in detection ranges adjacent thereto.

* * * * *